May 1, 1951 D. B. FERGUSON 2,551,321
CASTING REEL
Filed Nov. 10, 1947 2 Sheets-Sheet 1
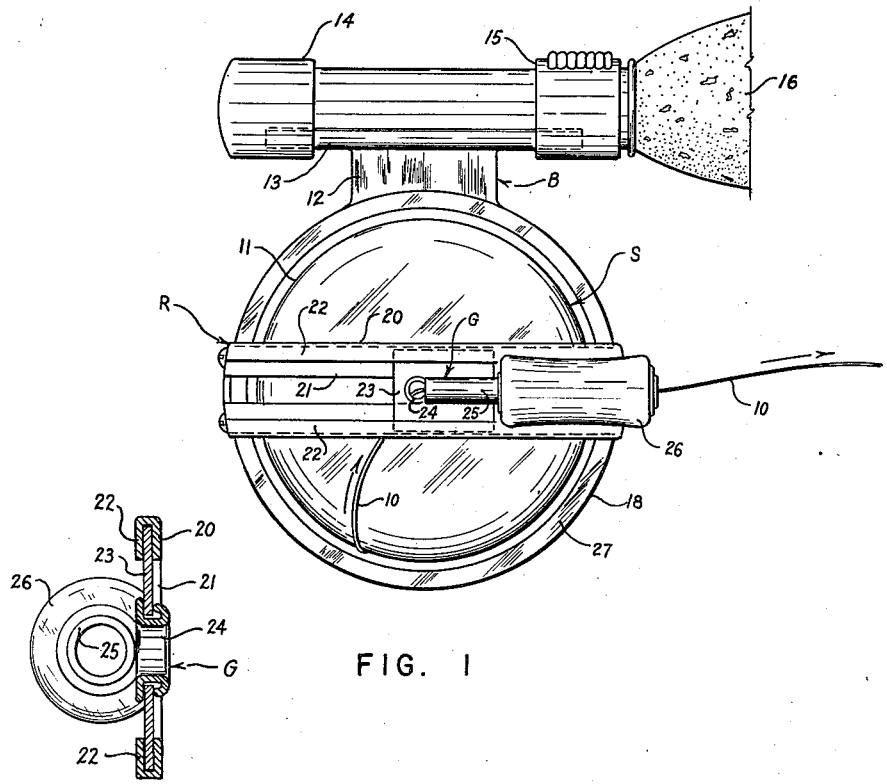
FIG. 1
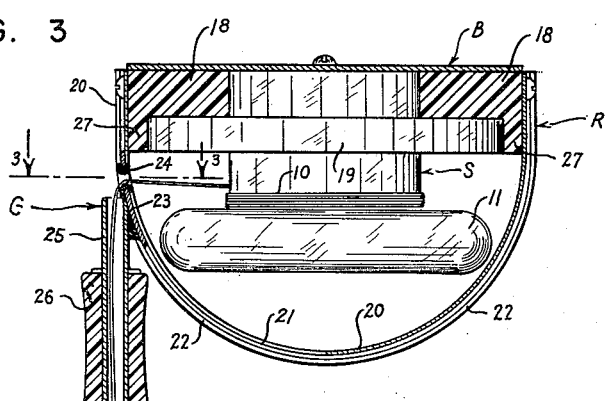
FIG. 3
FIG. 2
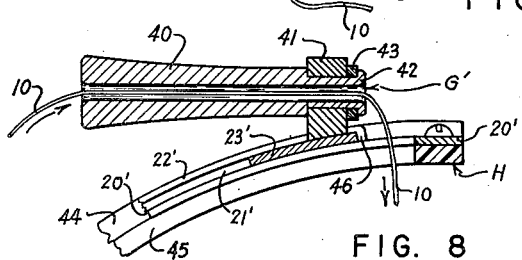
FIG. 8
INVENTOR.
DANIEL B. FERGUSON
BY
Lamphere & Van Valkenburgh
ATTORNEYS May 1, 1951 D. B. FERGUSON 2,551,321
CASTING REEL
Filed Nov. 10, 1947 2 Sheets-Sheet 2
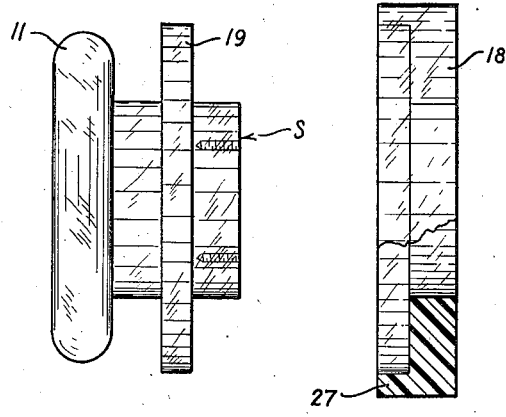
FIG 4
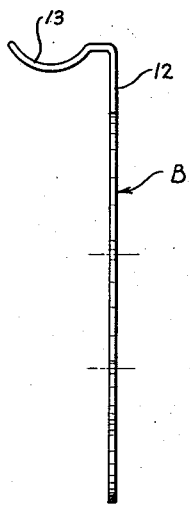
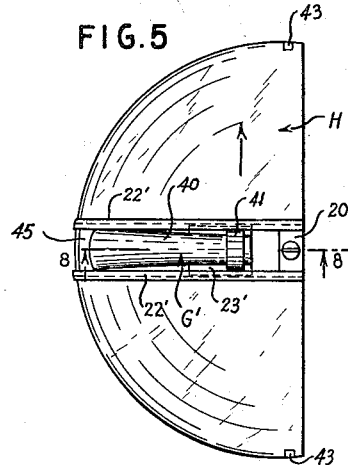
FIG.5
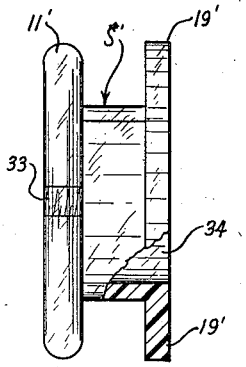
FIG.6
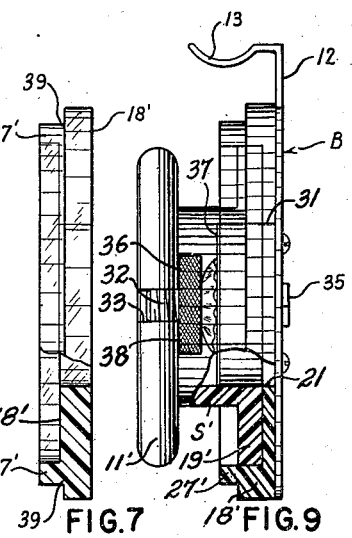
FIG.7 FIG.9
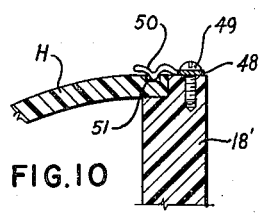
FIG.10
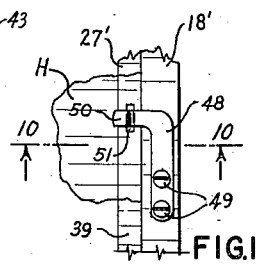
FIG.11
INVENTOR.
DANIEL B. FERGUSON
BY
Lamphere & Van Valkenburgh
ATTORNEYS Patented May 1, 1951

2,551,321

UNITED STATES PATENT OFFICE 2,551,321

CASTING REEL

Daniel B. Ferguson, Denver, Colo.

Application November 10, 1947, Serial No. 784,962

21 Claims. (Cl. 242—84.5)

This invention relates to casting reels used in fishing, and more particularly to casting reels of the so-called "spinning" type, in which the line during casting passes off the end of a spool. This invention relates to the subject matter of my copending application Serial No. 748,051, filed May 14, 1947, entitled "Casting Reel."

A previous casting reel of the spinning type, which is quite well known, consists of a spool mounted with its axis parallel to the axis of the rod on which the spool is mounted. During casting, the line, which is wound on the spool, passes off the end of the spool toward the tip of the rod. When the line is to be wound in, a pickup arm or finger, which is placed in a non-interfering position during casting, is swung back into winding position, and forces the line to travel around onto the spool as the arm rotates. Such a spool is, of course, stationary at all times and the rotating arm tends to foul the line and also may be in various positions when the fisherman wishes to start winding in. Thus, it is often necessary to search for the arm, which sometimes delays the start of the winding operation sufficiently, so that the fish may be lost. Also, the diameter of the spool is limited, so that it is necessary to provide a step-up in speed between the crank and the pickup arm. Furthermore, since the crank must be positioned to extend to the side of the rod, the reel is unduly complicated by such positioning of the crank.

In my copending application Serial No. 748,051, there is disclosed a casting reel which comprises, in general, a housing adapted to be attached to a fishing rod in the usual manner, the housing being divided into two parts—a base and a cover, both preferably being made of transparent material, such as a plastic resin. The spool is mounted on the base within the cover, and is rotatable by a handle extending from the base, while the cover carries a line guide, which is movable from an unwinding position (substantially on the axis of the spool) to a winding position (transverse to the axis of the spool and in alignment with the space between the spool flanges). In the unwinding position, the line passes freely off the end of the spool, while in the winding position the spool is turned to cause the line to wind thereon. Due to the loops coming off the spool, under certain conditions and more particularly with certain types of line, knots or kinks tend to develop in the line upon continued usage for a number of hours. Thus, while the casting reel of my copending application Serial No. 748,051 operates effectively and efficiently in certain types and shorter periods of use, in certain other types and long periods of use, the knotting and kinking of the line may become objectionable.

Among the objects of this invention are to provide a novel casting reel of the spinning type; to provide such a reel by which the tendency for the line to knot or kink, irrespective of the number of hours of use or type of line used, is overcome; to provide such a reel in which the line readily passes off the reel for casting and the like, and is easily wound back onto the reel; to provide such a reel in which the line is turned or twisted during winding, in a direction reverse to that in which it passes off the spool, so that each time the line is wound back onto the reel, it will receive the same number of reverse twists as the number of loops which previously passed off the end of the spool; to provide such a reel in which the changeover from casting to winding or reeling position is easily and readily effected; and to provide such a reel which is relatively simple in construction and has little tendency to get out of adjustment.

Other objects and the novel features of this invention will become apparent from the following description, taken in connection with the accompanying drawings, in which:

Fig. 1 is a side view of a reel constructed in accordance with this invention, mounted on a fishing rod, and in unwinding or casting position;

Fig. 2 is a cross section taken along line 2—2 of Fig. 1, but with the reel in winding or reeling position;

Fig. 3 is an enlarged fragmentary section taken along line 3—3 of Fig. 2, illustrating more clearly a guide for the line;

Fig. 4 is an exploded view showing certain parts of the reel of Fig. 1, in relative position prior to assembly;

Fig. 5 is a side elevation of a housing forming a part of a reel constituting an alternative embodiment of this invention;

Fig. 6 is a side elevation of a spool of the alternative reel;

Fig. 7 is a side elevation of a ring of the alternative reel;

Fig. 8 is an enlarged fragmentary section taken along line 8—8 of Fig. 5;

Fig. 9 is a side elevation of a base of the alternative reel, with the spool of Fig. 6 and the ring of Fig. 7 mounted thereon;

Fig. 10 is a cross section taken along line 10—10 of Fig. 11; and

Fig. 11 is a fragmentary view, on an enlarged scale, of a fastening device for removably attaching the housing of Fig. 5 to the ring of Fig. 7.

As illustrated in Figs. 1 and 2, a casting reel constructed in accordance with this invention comprises, in general, a base B to which is affixed a normally stationary spool S, and an optionally rotatable line guide support R, on which a line guide G is movable from the unwinding or casting position of Fig. 1 to the winding or reeling position of Fig. 2. In the winding position of Fig. 1, wherein the guide G is disposed generally axially of the spool S, a line 10 passes off a smooth, rounded circular flange 11 at the outer end of the spool S, and through the line guide G, in the direction of the arrows of Fig. 1. For winding, the line guide G is shifted on the support R to the position of Fig. 2, in which it is disposed generally transversely or radially of the spool S and in which it is adapted to lay the line on the spool S, upon rotation of the support R and line guide G, by utilization of the guide G in a manner described later. The direction of rotation of the support R and guide G is in the direction in which the line is to be wound onto the spool. Thus, in the construction shown, the rotation of the guide G and support R is in a clockwise direction, as viewed from the outer side of the reel. The rounded, smooth edge of inner flange 11 not only assists in winding the line onto the spool, but also offers less resistance to the movement of the line off the spool, during unwinding or casting.

The base B, as in Figs. 1 and 4, may comprise a metal plate or the like, circular in form but provided at one edge with a neck 12 by which the reel is supported from a conventional rod in a usual manner, such as by a transversely curved attaching bracket 13 received by a fixed ring 14 and a movable ring 15 mounted rearwardly of the handle 16 of the rod. Of course, if desired, the reel may be mounted forwardly of the rod handle.

As in Figs. 2 and 4, the rotatable support R may include a ring 18 encircling the inner end of spool S and adapted to rotate beween base B and an inner flange 19 of spool S. The support R, as in Figs. 1 and 2, also includes a semi-circular strip 20 attached at its ends to the ring 18, and provided for substantially 90° of its extent with a central slot 21 to accommodate the line 10 and movement thereof. As in Fig. 3, strip 20 may be provided at each side with flanges 22, which form a guideway for movement of the line guide G, which includes a plate 23 received by flanges 22. The line 10 passes through an eye 24, attached to plate 23 in a central aperture formed for the purpose, the eye 24 also being adapted to engage the ends of slot 21, to stop the guide G in the desired winding or unwinding position. The line guide G also includes a tube 25, welded, brazed or otherwise suitably secured to plate 23 at a slight angle thereto, such as that shown. During unwinding or casting, as in Fig. 1, the line 10 passes outwardly through tube 25 and forwardly in the direction of the arrow of Fig. 1, while during winding or reeling, as in Fig. 2, the line passes inwardly through the tube 25 to the eye 24, and onto the spool.

Tube 25 of guide G is also adapted to form a pin or bearing for a generally cylindrical handle 26, utilized in moving the guide G from winding to unwinding position, and vice versa, and additionally utilized in turning the support R about the spool S. Thus, during winding, the handle 26 may be grasped by the user, as by the thumb and one or two fingers, the line 10 passing through the remaining fingers of the user, and the guide G and support R rotated about the spool S. As the line is wound onto the spool, tube 25 and the hand of the user prevent any tendency for the line to become fouled on the support R, while the hand of the user is also in position to grasp the line readily, as for quickly pulling in slack in playing a fish. In addition, when guide G is moved from casting to winding position, the handle 26 may be grasped by the hand of the user, so that winding or reeling may follow immediately.

As will be evident from Fig. 1, the strip 20 permits ready access to spool S, as when a new line is to be wound onto the spool. The end of the line is readily inserted through tube 25, then through eye 24 and attached to the spool. Also, when the line is inadvertently pulled through the tube and eye, such as a line without a hook or other projection, which permits the end thereof to pass through the eye and tube, the end of the line is readily inserted through eye 24 from the inside, and then through tube 25. If desired, a closed passageway between the eye 24 and the tube 25 may be provided, but with such a passageway it is much more difficult to thread the line through the eye and tube.

For greater stability, the spool S may be fastened to base B by more than one screw, as evident from Fig. 4, and, as in Figs. 2 and 4, the ring 18 may be provided with an axial flange 27, adapted to overlie the inner flange 19 of spool S, flange 27 thereby preventing any tendency for the line to wind about the inner flange 19 and further maintaining the stability of the rotating parts with respect to the non-rotating parts.

In an alternative embodiment of this invention illustrated in Figs. 5 to 8, a spool S' is capable of rotating relative to base B, but a friction brake is provided, so that the spool S' will rotate only upon a predetermined pull, as on the line. This is useful when the line becomes caught during winding, or an unexpectedly strong pull is given on the line by a fish, thereby preventing breakage of the line. Also, if slack in the line is desired during winding, it is necessary for the user only to pull the line off the spool by rotating the spool, rather than by shifting the line guide G to the casting position. By pulling on the line to rotate the spool S' against the friction brake, better control of the line is obtained in unwinding the line for a short distance.

In the construction of Figs. 5 to 11, the rotatable support for a novel line guide G', described in detail later, includes a housing H of Fig. 5, preferably hemispherical and formed of clear or translucent material, such as a plastic resin or the like. The housing H, when transparent, permits a full view of the spool S' of Figs. 6 and 9 and the line wound thereon to be obtained, and also protects the line and spool from becoming fouled with leaves, brush or the like, particularly when the fisherman is making his way from one place to another.

The spool S' is constructed in a novel manner, to receive the friction brake associated therewith, the brake being constructed in a manner similar to that disclosed in my copending application, Serial No. 748,051, supra. The spool S' is mounted on a cylindrical block 31 of Fig. 9, the latter being attached to base B and provided with a central hole through which extends a pin or bolt 32, threaded at one end to engage a threaded aperture 33 in spool S', while spool S' is provided with a well 34 to receive block 31 and provide additional space for the friction brake. Spool S' and pin 32 rotate together when the spool is rotated against the friction brake. Threaded aperture 33 may or may not extend to the outer surface of the spool, as desired. The head 35 of bolt 32 may be disposed exteriorly of base B, so that it may be held while the friction brake is adjusted, the latter comprising a cup spring 36 bearing against a metal washer or circular plate 37 and compressed by a nut 38. By adjusting the compression of nut 38, the force necessary to turn the spool against the frictional resistance of cup spring 36 may be varied as desired.

Spool S' is provided with a smooth, rounded outer flange 11' and an inner flange 19', being exteriorly similar to spool S of Figs. 1 to 4. Preferably, the line is wound on spool S' in the same direction as the spool S' is threaded onto bolt 32, so that when the spool is rotated to unwind a section of line, the spool will tend to be tightened on bolt 32, rather than loosened. The support for line guide G' includes a ring 18' of Figs. 7 and 9, which is similar to ring 18 of Fig. 4, except that its outer flange 27' is provided with an annular groove 39 about the outer periphery, adapted to receive the edge of hemispherical housing H. It will be understood, of course, that the spool S' having a well to receive a friction brake or other parts, may be utilized in other types of reels, wherein the block 31, for instance, is rotated and spool S' is rotated with it, as in winding in the line, the spool S' thereby being normally stationary with respect to the block, even though both are rotating. However, relative rotation between the spool and block is permitted by the friction brake, as when an unexpectedly strong pull comes on the line.

The line guide G' of the embodiment illustrated in Figs. 5 to 11 is provided with a handle 40 rotatably mounted in a collar 41 attached by soldering, brazing or the like, to a plate 23', as in Fig. 8. Handle 40 is generally tubular, but is smaller in diameter at the collar end to provide a shoulder abutting against the collar. Also, the end of the handle may be riveted over or the like to form a flange 42, with a washer 43 placed between collar 41 and flange 42, so that the smooth abutting surfaces of the collar and washer will permit relatively easy rotation. Plate 23' terminates at collar 41, so that an eye in the collar is unnecessary, the line passing directly to the spool S', as in Fig. 8.

Guide G' is movable from the winding to the unwinding position and vice versa, and the handle 40 thereof is utilized in rotating the housing H in the direction of the arrow of Fig. 5, when winding the line onto the spool S'. The line guide G' is adapted to be moved along a strip 20', which may be attached at its ends to housing H by screws or the like, as shown. The strip 20' may be mounted on the exterior of housing H, but is preferably received in a groove 44 formed in the outer surface of housing H, a portion of the groove including a slot 45 through which the line passes. The strip 20' may be formed in a manner similar to strip 20 of Figs. 1 to 3, i. e., provided with flanges 22' adapted to receive the sliding plate of the line guide G', but each flange, as in Fig. 8, may terminate and be bent over to form an abutment 46 at a suitable position to act as a stop for plate 23', and consequently for guide G', when the latter is moved from unwinding position to winding position, or vice versa. Of course, stops may be provided for line guide G' in any other suitable manner.

An advantage of the construction of line guide G' lies in the fact that, in the first embodiment, the line 10 tends to cut the eye 24 at one place, so that the eye should be made of hard, and therefore more expensive, material. However, since handle 40 of Figs. 5 and 8 rotates during winding, the wear occasioned by the line passing to the spool is distributed evenly around flange 42. However, it will be understood that either type of line guide may be used with either modification, and also that other types of slides and line guides may be used, such as disclosed in my copending application, Serial No. 748,051, supra.

To permit access to the spool S', as when a new line is to be wound thereon, the housing H is desirably readily removed from the ring 18'. For this purpose, a leaf spring 48 may be attached to the rim of ring 18', as in Figs. 10 and 11, at two or more radially spaced positions. Because of the limited space, the leaf spring 48 is preferably elongated in the direction of the rim of ring 18', being attached thereto adjacent one end, as by screws 49. The opposite end of the spring 48 is provided with a clip 50 adapted to fit into a slot 51 in housing H. The spring 48 is preferably sufficiently strong so that the housing H will be held securely to ring 18' during use of the reel, but also sufficiently flexible so that the housing is relatively readily removed from the ring, as when access to the spool S' is desired.

Any suitable material may be utilized in constructing the reel of this invention. For instance, the base B may be made of metal, while the spools S and S' and rings 18 and 18', as well as the block 31 of the second modification, may be made of a plastic resin. The slide plate 23, eye 24 and tube 25 of line guide G, may be made of metal, preferably sufficiently hard to resist wear, while the handle 26 may be made of plastic resin or wood. The plate 23', handle 40 and collar 41 of line guide G' are preferably made of metal. The strips 20 and 20' are preferably made of metal, while the remaining parts are made of material suitable thereto. It will be understood, of course, that materials other than those mentioned above may be utilized.

From the foregoing it will be apparent that the reel of this invention fulfills to a marked degree the requirements and objects hereinbefore set forth. A normally stationary spool, in combination with a movable line guide, insures that the line will readily pass off axially, i. e., off the end of the spool, as during casting. Also, when the line is wound back onto the spool with the same number of turns as during unwinding, the tendency for the line to kink is overcome, because the turns placed in the line during winding are in a direction reverse to the turns during unwinding. A line guide having a handle by which the guide may be rotated during winding provides simplicity in operation, since the same handle used to move the line guide from unwinding back to winding position, is also used in winding the line back onto the spool. The strip of the first modification, along which the line guide is moved, permits ready access to the spool and also contributes to lightness in weight, which is often desirable. However, the spool may be completely enclosed, as in the second modification, wherein the readily removable, transparent housing affords the user a view of the line on the spool at all times, but permits convenient access to the spool when the housing is removed. The tube of the line guide not only provides a shaft or pin for rotation of the handle, but when open ended, facilitates the threading of the line through the line guide, since the line may be passed first through the eye, and then through the tube, or vice versa, each movement of the end of the line being in a straight line. A spool having a friction brake, which prevents rotation thereof except upon a predetermined pull on the line, as in the second modification, has considerable advantages, as explained previously. Furthermore, the structural arrangement of the parts of each modification is such that assembly of the reel is relatively simple.

Although two modifications of this invention have been illustrated and described, it will be understood that other modifications may also exist. For instance, the transparent, spool-enclosing housing of the second modification may be utilized in the first modification, in lieu of the guide strip for the line guide, and vice versa. Also, a friction brake for the spool may be provided in the first embodiment. It will further be understood that other and different modifications may exist, and various other changes may be made, all without departing from the spirit and scope of this invention.

What is claimed is:

1. In a casting reel, a normally stationary spool on which a fishing line or the like may be wound; and a line guide for guiding said line onto and off said spool, said line guide being movable to an unwinding position located generally axially of said spool, in which position said line may be unwound from said spool by passing off the end thereof, said line guide also being movable to a winding position located generally radially with respect to said spool, and said line guide being rotatable about the axis of said spool in said winding position so as to cause said line to be wound on said spool.

2. A casting reel comprising a spool on which a fishing line or the like may be wound; a line guide for guiding said line onto and off said spool; and a support for said line guide, said support being rotatable about the axis of said spool and said line guide being movable on said support from a winding position located generally radially of said spool to an unwinding position located generally axially of said spool, said line guide causing said line to be wound on said spool upon rotation of said support with said line guide in said generally radial position.

3. A casting reel as defined in claim 2, wherein said support includes a strip extending generally about said spool and on which said line guide is movable.

4. A casting reel as defined in claim 2, wherein said support includes a housing substantially enclosing said spool in spaced relation thereto.

5. A casting reel as defined in claim 2, wherein said line guide includes a plate provided with an eye through which said line is adapted to pass.

6. A casting reel as defined in claim 2, wherein said line guide includes a plate and a tube extending angularly thereto, said line being adapted to pass through said tube.

7. A casting reel as defined in claim 6, wherein said line guide includes a handle rotatably mounted on said tube.

8. A casting reel comprising a spool on which a fishing line or the like may be wound; a line guide for guiding said line onto and off said spool, said line guide including a plate and a tube extending angularly thereto and said plate being provided with an eye through which said line is adapted to pass; and a support for said line guide, said support being rotatable about the axis of said spool and said line guide being movable on said support from a winding position located generally radially of said spool to an unwinding position located generally axially of said spool, said line guide causing said line to be wound on said spool upon rotation of said support with said line guide in said generally radial position.

9. A casting reel as defined in claim 8, wherein said tube terminates adjacent said eye.

10. A casting reel comprising a base adapted to be attached to a pole; a spool mounted on said base and on which a fishing line or the like may be wound; a line guide for guiding said line onto and off said spool; and a support for said line guide, said support including a ring extending between said base and spool and rotatable with respect thereto, and said line guide being movable on said support from a winding position located generally radially of said spool to an unwinding position located generally axially of said spool.

11. A casting reel as defined in claim 10, wherein said support includes a strip attached to said ring and extending generally about said spool, said strip being provided with a slot to accommodate said line and said line guide being movable along said strip.

12. A casting reel as defined in claim 10, wherein said support includes a housing removably attached to said ring and substantially enclosing said spool, said housing being provided with a slide for movement of said line guide.

13. A casting reel as defined in claim 12, wherein said housing is transparent.

14. A casting reel comprising a base adapted to be attached to a pole; a spool mounted on said base and on which a fishing line or the like may be wound; a line guide for guiding said line onto and off said spool; a ring extending between said base and spool and rotatable with respect thereto; a housing removably attached to said ring and substantially enclosing said spool, said ring being provided with a peripheral groove for reception of said housing and said housing being provided with a slide for movement of said line guide, said line guide being movable on said slide between a winding position located generally radially of said spool to an unwinding position located generally axially of said spool; and a plurality of spaced leaf springs attached to the periphery of said ring adjacent one end and at the other end having clips adapted to extend onto said housing, said housing having a groove adapted to receive said clips.

15. A casting reel comprising a base adapted to be attached to a fishing rod or the like; a spool pivotally mounted on said base and on which a fishing line or the like may be wound; a line guide for guiding said line onto and off said spool; a support for said line guide, said support including a ring rotatable with respect to said spool, and said line guide being movable on said support between a winding position located generally radially of said spool and an unwinding position located generally axially of said spool; and a frictional brake adapted to permit rotation of said spool only upon application of a predetermined force on said spool.

16. A casting reel comprising a base adapted to be attached to a fishing rod or the like; a spool pivotally mounted on said base and on which a fishing line or the like may be wound, said spool having a rounded outer flange, an inner flange, a cylindrical well extending thereinto on the inner side, and a central threaded hole extending from said well toward the outer side of said spool; a line guide for guiding said line onto and off said spool; a support for said line guide, said support including a ring having an outer flange overlying the inner flange of said spool and rotatable with respect to said spool, and said line guide being movable on said support between a winding position located generally radially of said spool and an unwinding position located generally axially of said spool; a cylindrical block fixedly mounted on said base and received by said spool well; a pin threaded at its outer end and extending centrally from said block, said pin being adapted to threadedly engage the central threaded hole in said spool; a cup spring mounted on said pin adjacent said block; and an adjusting nut on said pin compressing said spring against said block, said spool well providing space to accommodate said spring and nut.

17. A casting reel comprising a spool on which a fishing line or the like may be wound; a line guide for guiding said line onto and off said spool, said line guide including a plate provided with an eye through which said line is adapted to pass, a tube extending angularly to said plate and attached thereto, said line being adapted to pass through said tube and the end of said tube being disposed adjacent said eye, and a rotatable handle on said tube; and a support for said line guide, said support being rotatable with respect to said spool and said line guide being movable on said support between a winding position located generally radially of said spool and an unwinding position located generally axially of said spool.

18. A casting reel comprising a spool on which a fishing line or the like may be wound; a line guide for guiding said line onto and off said spool, said line guide including a plate, a collar attached to said plate, and a handle journalled in said collar and having a central passage through which said line is adapted to pass; and a support for said line guide, said support being rotatable with respect to said spool and said line guide being movable on said support from a winding position located generally radially of said spool to an unwinding position located generally axially of said spool.

19. In a casting reel, a spool on which a fishing line or the like may be wound, said spool having an outer flange, an inner flange, a cylindrical well extending thereinto on the inner side, and a central threaded hole extending from said well toward the outer side of said spool; a cylindrical block received by said spool well and with respect to which said spool is normally stationary but said spool being rotatable with respect thereto upon application of a predetermined force upon said spool; a pin threaded at its outer end and extending centrally from said block, said pin being adapted to threadedly engage the central threaded hole in said spool; and a friction brake for said spool including a cup spring mounted on said pin adjacent said block and an adjusting nut on said pin compressing said spring against said block, said spool well providing space to accommodate said friction brake.

20. A casting reel comprising a base adapted to be attached to a fishing rod or the like; a spool mounted on said base and on which a fishing line or the like may be wound, said spool having a rounded outer flange, and an inner flange spaced from said base; a line guide for guiding said line onto and off said spool, said line guide including a plate provided with an eye through which said line is adapted to pass, a tube attached to said plate and through which said line is adapted to pass, and a handle rotatably mounted on said tube; a ring extending into the space between said base and said inner flange of said spool and thereby rotatable with respect to said spool, said ring having a peripheral flange overlying the inner flange of said spool; and a semi-circular strip attached at its ends to said ring and providing a slide for said plate, said line guide being movable on said strip between a winding position located generally radially of said spool and an unwinding position located generally axially of said spool.

21. A casting reel comprising a base adapted to be attached to a fishing rod or the like; a spool pivotally mounted on said base and on which a fishing line or the like may be wound, said spool having a rounded outer flange, an inner flange, a cylindrical well extending thereinto on the inner side, and a central threaded hole extending from said well toward the outer side of said spool; a cylindrical block fixedly mounted on said base and received by said spool well; a pin threaded at its outer end and extending centrally from said block, said pin being adapted to threadedly engage the central threaded hole in said spool; a cup spring mounted on said pin adjacent said block; an adjusting nut on said pin compressing said spring against said block, said spool well providing space to accommodate said spring and nut; a line guide for guiding said line onto and off said spool, said line guide including a plate, a collar attached thereto, a handle rotatably mounted adjacent one end in said collar and having a central passage through which said line is adapted to pass, and a washer abutting against said collar adjacent said end of said handle, said end of said handle being riveted over against said washer; a ring having an outer flange overlying the inner flange of said spool and rotatable with respect to said spool; a hemispherical, transparent housing generally enclosing said spool and detachably connected to said ring; and a strip attached to said housing and having flanges adapted to provide a guideway for said plate of said line guide, said line guide being movable on said strip from a winding position located generally radially of said spool to an unwinding position located generally axially of said spool.

DANIEL B. FERGUSON.

REFERENCES CITED

The following references are of record in the file of this patent:

UNITED STATES PATENTS

| Number | Name | Date |
| --- | --- | --- |
| 1,187,840 | Illingworth | June 20, 1916 |
| 1,617,543 | Roberts | Feb. 15, 1927 |
| 2,229,470 | Pezon | Jan. 21, 1941 |

FOREIGN PATENTS

| Number | Country | Date |
| --- | --- | --- |
| 8,517 of 1910 | Great Britain | Jan. 26, 1911 |